United States Patent [19]

Hizo et al.

[11] 4,300,050

[45] Nov. 10, 1981

[54] SECONDARY-STANDARD IONIZATION CHAMBER, IN PARTICULAR FOR MEASURING THE ENERGY DOSE

[75] Inventors: József Hizó, Budapest, Hungary; Klaus Duftschmid, Gumpolskirchen, Austria

[73] Assignee: Österreichisches Forschungszentrum Seibersdorf GmbH, Vienna, Austria

[21] Appl. No.: 128,528

[22] Filed: Mar. 10, 1980

[30] Foreign Application Priority Data

Mar. 12, 1979 [HU] Hungary .................... OA 618

[51] Int. Cl.³ ............... H01J 39/28; G01D 18/00
[52] U.S. Cl. .................................. 250/374; 250/252
[58] Field of Search ............ 250/252, 374, 375, 510; 313/93

[56] References Cited

U.S. PATENT DOCUMENTS

| | | | |
|---|---|---|---|
| 2,536,991 | 1/1951 | Wollan et al. | 250/374 |
| 2,683,234 | 7/1954 | Lynch | 250/374 |
| 3,898,464 | 8/1975 | Stephan | 313/93 |

FOREIGN PATENT DOCUMENTS 664465 9/1965 Belgium .................... 313/93

Primary Examiner—Davis L. Willis
Assistant Examiner—Carolyn E. Fields
Attorney, Agent, or Firm—Werner W. Kleeman

[57] ABSTRACT

An ionization chamber for measuring an energy dose having a chamber wall with an electromagnetic radiation absorption characteristic equivalent to air, tissue or water and a neck part and being closed on all sides, an air compensation orifice; an outer electrode formed by a conductive coating on the inner surface of the chamber wall, an inner electrode and an electrically conductive ring surrounding the neck part of the chamber wall is disclosed. The chamber wall consists of at least 85% by weight of a base material containing polyacetal in a mixture with up to 20% by weight of polytetrafluoroethylene having additives consisting of one or more of calcium oxide, aluminum oxide, aluminum and carbon. The conductive coating on the inner surface of the chamber wall consists of a material containing one or more elements having an atomic number greater than 8.

12 Claims, 5 Drawing Figures

SECONDARY-STANDARD IONIZATION CHAMBER, IN PARTICULAR FOR MEASURING THE ENERGY DOSE

BACKGROUND OF THE INVENTION

The present invention relates to an ionization chamber which can be used as a secondary dosimetric standard and which can be employed as a calibration standard for measuring the photon radiation energy absorbed in body tissue, in water or air.

Secondary standards are measuring instruments which have superior metrological properties and have been calibrated by direct comparison with primary standards, that is to say national calibration standards which have been prepared by primary laboratories and verified by linking them to international primary standards. Such instruments require a high accuracy of measurement, long-term stability and reproducibility.

To obtain the long-term stability demanded for secondary standards, a good long-term volume stability is especially necessary for secondary-standard ionization chambers (SSI). At the same time, to obtain the requisite accuracy of measurement, in addition to the volume stability, a high invariability of the electric fields in the ionization chamber is also necessary since variations of the latter, with the same level of energy dose absorbed in the ionization chamber, cause differences in the ionization currents used as the measured parameter. Moreover, for determining the energy dose by means of ionization chambers, it is necessary to use chamber wall materials which are largely equivalent to air, water or tissue. Likewise, substantial independence of the energy must be demanded, in particular for the determination of the energy dose of mixed radiation, for example, due to scattered radiation and/or rays of different $\gamma$-energy. These demands are not met by ionization chambers which are intended for routine use, in particular, in medicine and in radiation protection.

Ionization chambers with chamber walls which are closed on all sides and are used at the same time as outer electrodes, are used as SSI. Such chambers are operated with air under normal ambient conditions. To produce the same atmospheric condition in the ionization chamber as the conditions which can be determined by measurement technology in the surroundings, there is a small "air compensation orifice" in the chamber wall. To obtain the requisite long-term volume stability, SSI have hitherto been manufactured only from graphite with an inner electrode of aluminum, since the demand for the requisite mechanical stability cannot be met with other materials likewise used for ionization chambers, such as, for example, mixtures of polyethylene and plyformaldehyde (French Pat. No. 1,360,381).

Graphite SSI are optimized so that they are suitable for calibration by comparison with the open air chambers used as the primary standard; the ion dose (exposure) being used as the measured parameter.

Since the new fixing of the internationally recognized measurement units of the SI system of units, the Röntgen (R) has been deleted as a unit of measurement. As the new unit, the Gray unit (Gy) has been fixed in which, in contrast to the ion dose measured in Röntgen, the particular absorbed energy dose in measured.

Since the chamber walls of the graphite ionization chambers, do not consist of a material equivalent to air, water or tissue, the calibration of the graphite chambers, previously calibrated by comparison with open air chambers, for the determination of the dose in water or tissue is made much more difficult because of the variable dependence on the energy, caused by the material. The reason for this is that, on the one hand, the effective atomic number of graphite is far away from that of human tissue and, on the other hand, considerable errors can arise in measurements in phantoms. This is because these chambers in the phantom vary considerably their energy dependence, which is optimized for open air measurements, due to the inhomogeneity caused by the combination of a graphite outer wall and an aluminum inner electrode. Aluminum, the atomic number of which is higher than that of air or tissue, is used for compensating the unduly low atomic number of graphite. This compensation is possible in each case only for a small energy range. To reach the secondary electron equilibrium required for the measurement, wall thicknesses of a few mm are necessary for gamma radiation, which wall thicknesses, on the other hand, already lead to intolerably high absorption losses in the measurement of X-radiation due to the low energy of the latter. The graphite SSI hitherto used are optimized for X-radiation and therefore require additional wall-reinforcing caps for the measurement of gamma radiation. This type of measurement, however, causes undesirable inaccuracies in the measurement, in particular in the boundary regions.

A further disadvantage in the construction of the ionization chambers hitherto used is the generation of uncontrollable measurement errors due to electrical phenomena in the boundary layer between the electrodes, which are electrically separated from one another, in the neck part of the chamber. The electric potential of this insulating layer varies as a function of the atmospheric humidity and temperature in the interior of the chamber, whereby the electric field in the interior of the chamber is distorted. This leads to a variation of the ionization current of the inner electrode. These measurement errors which, in general, can be disregarded in normal ionization chambers are unacceptable for secondary standards.

SUMMARY AND OBJECTS OF THE INVENTION

It is the object of the present invention to develop a SSI which is suitable for the determination of the energy dose and which consists of a wall material equivalent to air, tissue or water, this material making it possible to obtain the necessary long-term volume stability of the wall material. It is a further object of constructing the SSI to enable energy dose measurements for photon radiation to be carried out with high accuracy in a wide energy range of between 20 keV and 1.3 MeV without additional wall reinforcements and to eliminate the abovementioned measurement errors due to field distortion because of electrical phenomena caused by atmospheric conditions on the surface of the chamber insulation.

Several processes have been disclosed for the preparation of substances, having an effective atomic number which corresponds to that of air, water or tissue, by mixing materials of different atomic numbers. Thus, for example, materials of this type were prepared in Swiss Pat. No. 465,073 from 85% of beryllium and 15% of aluminum or in German Auslegeschrift No. 1,156,514 from 82% of boron trioxide ($B_2O_3$), 13.6% of lithium oxide ($Li_2O$) and 4.4% of beryllium oxide (BeO). These materials have the mechanical stability properties required for the manufacture of SSI. In view of the required material equivalence which, in particular, also affects the energy relationship between the ion dose and the energy dose, these materials do not provide the accuracy demanded for secondary standards since the atomic numbers of the individual components of the mixture differ too widely from that of the components of water, air or tissue.

Processes for the preparation of materials, which are largely equivalent to air, tissue or water, from mixtures of plastics are known, for example from French Pat. No. 1,360,381 and German Pat. No. 386,601. These hitherto used materials, however, do not provide the mechanical stability properties required for SSI.

The present invention is based on the discovery that, in the plastic polyacetal ($CH_2O$), a base material suitable for the manufacture of SSI chamber walls has been found since, on the one hand, this possesses the requisite mechanical stability and, on the other hand, contains the elements oxygen and hydrogen contained in air, tissue or water, in addition to carbon.

Polyacetal, which is, for example, obtainable under the tradename DELRIN, possesses outstanding mechanical properties. In particular, it has a high mechanical strength which, when used as a wall material for SSI, makes good volume stability possible. The material can be processed in the conventional manner by injection-molding so that, for example, even spherical ionization chambers having diameters from 1 to 30 cm can be made. It is a further advantage of this material that its electrical surface resistivity is greater than $10^{16}$ Ohm. Moreover, due to its chemical composition, it contains more than 50% of $H_2O$, which is advantageous for adjusting the material equivalence, in particular for use as a therapy dosimeter in a water phantom.

A further feature of the present invention is based on the fact that, due to the addition of up to 20% of polytetrafluoroethylene (PTFE) to the polyacetal, the mechanical stability property required for its suitability as a wall material for SSI is not adversely affected. At the same time, however, a substance having an atomic number close to that of hydrogen and oxygen is introduced by the fluoro-containing material components. It is thus possible to achieve a better equivalence to tissue, air or water, based on such a mixture of plastics, by adding small additions of substances of a higher atomic number, for example, aluminum oxide or calcium oxide.

Due to excellent equivalence of polyacetal to tissue, air and water, respectively, a mixture of polyacetal having up to 20% by weight polytetrafluoroethylene and only very small amounts of additives with an atomic number higher than 8 is necessary to get the required equivalence. As can be shown by the calculation of the absorption coefficients such additives are limited in the case of aluminum up to 10% by weight, in the case of a mixture of aluminum oxide and carbon up to 20% of aluminum oxide in the additive mixture and in the case of CaO up to 5% by weight. Such small amounts of additives required to achieve material equivalence result in a sufficient energy independence within a wide range of measurements. Thus, for example, from a base material of polyacetal with 20% by weight of polytetrafluoroethylene, a mixture of 97% by weight of base material +3% by weight of CaO, which is equivalent to, for example, tissue an/or water, or a mixture of 99% by weight of base material and 1% by weight of CaO, which is equivalent to, for example, air, is obtained. Moreover, for example, pure metallic aluminum or mixtures of aluminum oxide and carbon in a finely powdered form can be added as additives to the granulated polyacetal as the starting material for processing by injection-molding.

The thickness of the polyacetal wall is determined by the upper end of the energy range in which the SSI is to be operated since it is necessary to achieve an equilibrium of secondary electrons in the chamber wall over the entire range of application. A wall thickness of at least 2 mm is required for an energy range limit of 1.3 MeV (gamma radiation of $60_{Co}$).

With such wall thicknesses, however, extensive absorption losses occur for low-energy gamma-rays or X-rays. The compensation of such losses in pulse-counting ionization chambers is described in German Auslegeschrift No. 1,156,514. These chambers are closed on all sides and are operated with a counting gas in the proportional range, by applying a layer of at least 0.05, but at most 1 mg/cm$^2$ of materials having a high atomic number, such as aluminum, copper or nickel, on the inner wall of the outer electrode.

Whilst, in chambers operating in the proportional range, the applied electric fields, due to impact ionization, lead to a current intensification of the particular current pulses triggered by the radiation, the ion pairs generated by the radiation are collected in ionization chambers operated in the saturation range. As a result of these differing mechanisms, it was found, surprisingly, that a substantial compensation, suitable for use as SSI, of the low-energy absorption losses is also ensured by a thin layer, located on the inner wall of the outer electrode. This layer is formed of a conductive material containing at least one component with an atomic number higher than 8, in particular in the form of an aluminum layer of at most 0.05 mg/cm$^2$ on the chamber walls of at most 3 mm thickness. The compensation of the absorption losses for low-energy X-radiation or gamma-radiation by the chamber wall with the aid, for example, of a thin aluminum layer, is based upon the following considerations:

(a) The effective atomic number of the compensating layer is greater than that of the chamber wall material so that a generation of secondary electrons, intensified relative to the chamber wall material, takes place due to the interaction (photo-effect) of the low-energy photon radiation with the compensation layer.

(b) The layer thickness of the compensation layer is sufficiently thin so that photon radiation and gamma-radiation of higher energy remain virtually unaffected and the production of secondary electrons for this radiation largely takes place only in the chamber wall material.

(c) The electrical surface resistivity of the compensation layer is less than $10^6$ Ohm so that there is an adequately conductive layer in the interior of the chamber surface and field distortions due to charge displacements in the insulator material are prevented.

The material for the compensation layer must be chemically stable and must firmly adhere to the wall material. The thickness of the compensation layer must not deviate by more than ±2.5% from the intended thickness.

The considerations listed above lead to the conclusion that aluminum is particularly suitable as a compensation material. This metal can be applied to the inner surfaces of the SSI by vacuum vapor-deposition or by electron beam sputtering in a well-controlled manner.

Compensation for the absorption loss for soft gamma-radiation can be obtained by optimum dimensioning of the layer thickness to such an extent that an excellent energy dependence of better than ±2% between 0.02 MeV and 1.3 MeV is achieved.

A further feature of the present invention serves largely to eliminate those variable errors, unacceptable for the use as SSI, which are caused by variations of the electric field, due to atmospheric conditions within the ionization chamber. Phenomena on the surface of the insulating material, which separates the outer electrode from the inner electrode in the neck part of the ionization chamber, cause errors of differing degrees during the measurement. Depending upon the moisture content and the temperature of the air, the electric potential of this insulating layer assumes differing values so that the electric field in the interior of the ionization chamber is distorted. The degree of the particular distortion depends on the time and the temperature and it influences the ionization current of the inner electrode. For normal ionization chambers, this distorting effect is immaterial, but it is an exclusion factor in the case of secondary standards, since it is not permissible to produce calibration standards with variable errors.

According to the present invention, the effect distorting the electric field, due to the electrode insulation, is eliminated by an arrangement in which the conductive coating, for example of aluminum, in the interior of the chamber wall, is continued into the neck part of the chamber and the inner electrode lead is taken coaxially with the latter out of the chamber. Moreover, as a continuation of the inner electrode, a conductive surface which is electrically separated from the inner electrode by a groove and which is connected to the protective ring and thus serves as a continuation of the protective ring, is formed on that part of the neck which, is opposite the electrically conductively coated surface of the outer electrode. With this construction, the chamber insulation can at most influence the electric field of the inner coating of the neck part and of the surface connected to the protective ring, but this does not cause any effect on the ionization current of the inner electrode.

BRIEF DESCRIPTION OF THE DRAWINGS

In the following description, the invention is explained in more detail by reference to an illustrative embodiment with the aid of the drawings FIGS. 1 to 5 in which.

DETAILED DESCRIPTION OF THE PREFERRED EMBODIMENT

Figure 1:
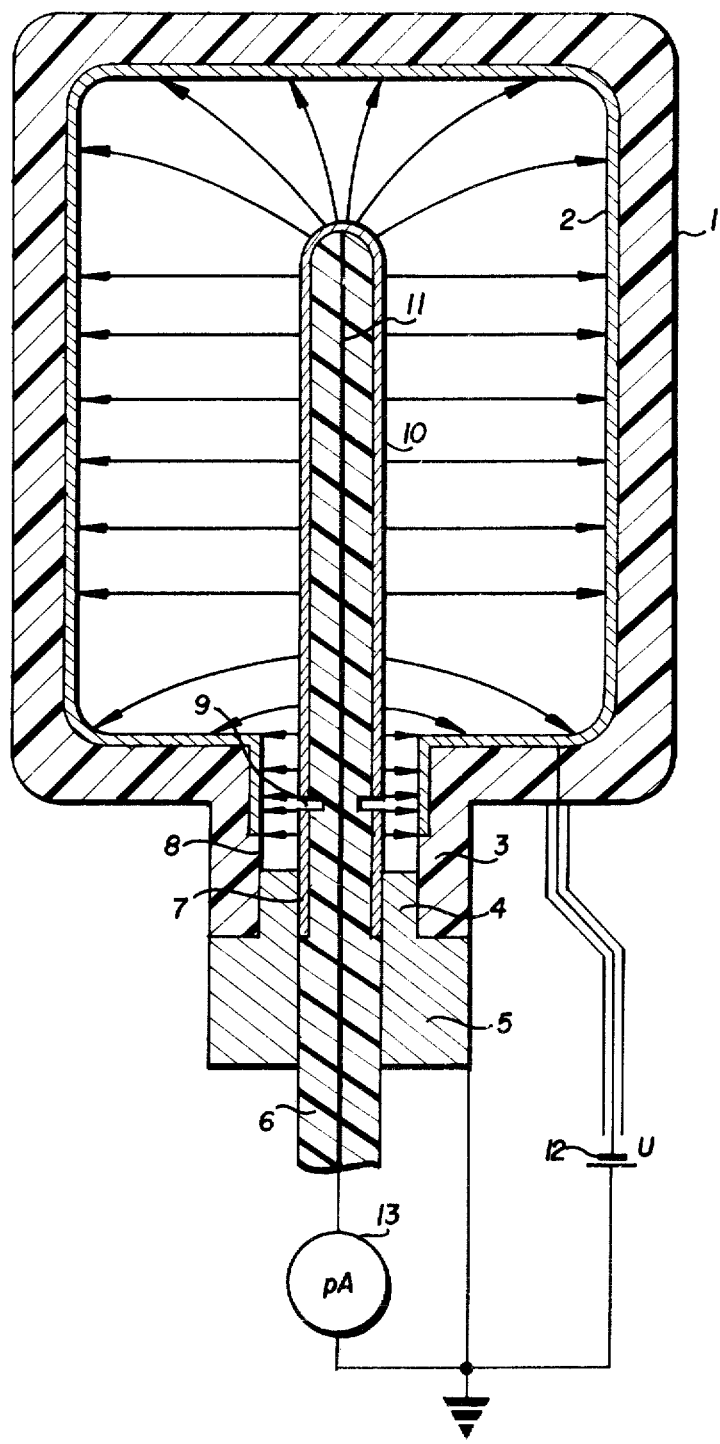
FIG. 1 shows a cross-section through an illustrative embodiment of the SSI according to the invention.

The ionization chamber shown in FIG. 1 has a chamber wall 1 which includes a cylindrical shell and on the inner surface of which a thin aluminum coating 2 is formed which represents the outer electrode of the ionization chamber. The neck part 3 of the chamber is connected to a protective ring 4 which consists of an electrically conductive material the shoulder part 5 of which adjoins the inner surface of the neck part 3, forming a seal. The surface 8 of the neck part 3, located between the ends of the aluminum coating 2 and the protective ring 4, insulates the aluminum coating 2 from the grounded protective ring 4. A shaft 6 made of an electrically insulating material and having an electrically conductive coating 7 on the upper part of its surface is located in the interior of the protective ring 4. The lower part of the coating 7 is in contact with the protective ring 4 and the cylindrical surface of the coating 7 is coaxial with the inner surface of the neck part 3. On the shaft itself, above the coating 7 in the zone of the electrically conductive surface of the neck part 3, a circumferential groove 9 is formed, whereby the inner electrode 10, which is formed by the electrically conductive coating located on the shaft 6 about the groove 9, is insulated from the coating 7. A conductive connection 11 which is connected to the inner electrode and serves as the lead-out for the electrical measured signal runs in the interior of the shaft 6.

FIG. 1 also shows the electrical connection of the ionization chamber. A voltage source 12 is provided in a circuit between the aluminum coating 2 forming the outer electrode and ground. The ionization current is measured by a picoamperemeter, preferably a digital current integrater, located between the grounded protective ring 4 and the inner electrode 10.

Figure 2:
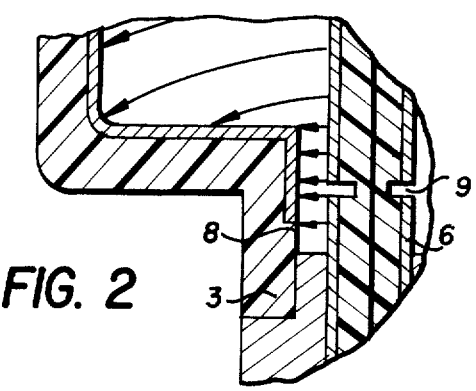
FIG. 2 shows an enlarged cut out of the neck part of the chamber shown in FIG. 1, FIGS. 3 and 4 show representations of the neck part of hitherto conventional ionization chambers, illustrating the field-distorting effect of the surface of the chamber insulation

It can be seen from FIG. 2, which shows the surroundings of the neck part 3 on an enlarged scale, that the groove 9 is located in the middle part of the conductive inner surface of the neck part 3 and the latter coaxially surrounds the two conductive cylindrical surfaces of the shaft 6, which are electrically separated from one another by the groove 9.

Figure 3:
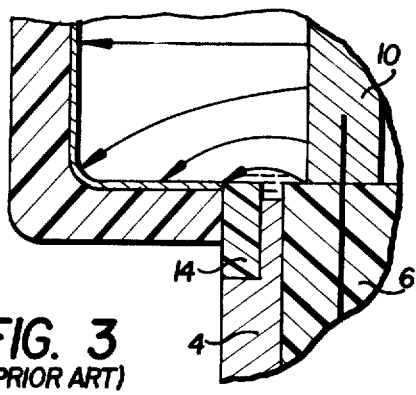
Figure 4:
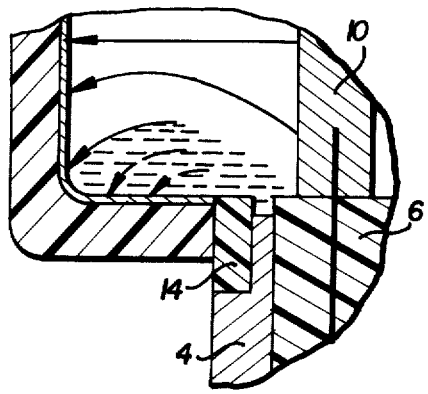

For comparison, FIGS. 3 and 4 show a hitherto known design of the neck part of ionization chambers with a protective ring. The neck part of the chamber is formed by an insulating ring 14 which adjoins the protective ring 4. The shaft 6, which adjoins the inner electrode 10 made of metal, the lower edge of which ends at the lower chamber wall, extends in the interior of the protective ring. In the downward direction, the chamber is separated in the middle from the end face of the insulating ring 14 and the shaft 6, between which there is an annular gap.

It is a prerequisite for stable functioning of the chamber, independent of external atmospheric effects, and hence for the good reproducibility of measured results, as required for SSI, that the field of the electric lines of force between the aluminum coating 2 and the inner electrode 10 does not vary.

This is ensured by the closure, according to the invention, of the SSI, as shown in FIG. 2. It is evident from the electrical connection diagram in FIG. 1 that the voltage applied to the picoamperemeter 13 is negligibly small compared with the voltage source 12. For this reason, the coating 7 and the inner electrode 10, insulated from the latter by means of the groove 9, can be regarded as surfaces of equal potential with respect to the course of the lines of force. In the inner annular air gap of the neck part 3, this results in a homogeneous distribution of the lines of force, the plane of the field of lines of force being parallel to the plane of the groove 9. This means that the presence of the groove 9 does not generate any field distortion. If, due to a change in the relative atmospheric humidity, the surface conductivity of the insulating section located on the inner surface of the neck part 3 between the aluminum layer 2 and the protective ring 4 varies, the measured signal, determined as a current value by the picoamperemeter, 13 is not affected.

By contrast, as shown in FIGS. 3 and 4, in the hitherto conventional embodiment of the neck part of ionization chambers with a protective ring, the surface conduction of the end face of the insulating ring 14 can vary due to a change in the atmospheric humidity. As a result of this change, the electric field in the interior of the chamber is distorted to a different degree and thus, the measured signal representing the energy dose also varies.

The design of the neck part in accordance with the present invention makes it impossible that for any variable uncertainties in the measurement to be caused by variations of pressure and humidity in the inner air space of the chamber.

An essential point for the use of calibration standards is the checking of their stability or usability. For this check, various procedures are known, for examples from German Pat. No. 703,633, wherein the ionization chamber to be checked is brought into a radiation field acting on the chamber from the outside. On the one hand, the radiation protection measures, necessitated by the required high radioactivity of the necessary test radiation, and also the stringent demands on the reproducibility of the geometry of the sample ionizaton chamber, have a disadvantageous effect in this procedure on the ability to achieve the quality of testing which is required for the testing of SSI.

Substantially smaller amounts of radioactive emitters are required for the test, when these emitters are fitted in the interior of the ionization chamber to be tested. Thus, for example, a procedure is known from U.S. Pat. No. 1,359,322, wherein $^{241}$Am is introduced into the center of a spherical ionization source. The test emitter is located in a guide tube located entirely within the ionization chamber and it can be retained by means of a holder in a lead screen. To check the chamber, this holder is magnetically opened and the test emitter is brought into the center of the ionization chamber under the action of the force of gravity. In this method, the radiation from the test source is utilized in an optimum manner for the test and the demands on the reproducibility of the geometry of the sample ionization chamber are not as stringent as in the case of test emitters located on the outside. It is a disadvantage, however, that the test emitter is permanently contained in the ionization chamber. The radiation protection measures which must be adhered to for radioactive materials are therefore also to be applied to the ionization chamber. Furthermore, only one test source having a defined radiation spectrum can be used so that it is not possible, for example, to check the entire energy range or dose range by means of several test points.

According to present invention, these disadvantages are eliminated by a slight change in the chamber structure when the radioactive test source is introduced through a tube from outside the SSI into the interior of the central electrode. Such an arrangement has the fundamental advantage that one or more radiation sources of lower activity, for example $^{241}$Am of 1 mCi, can be used as test emitters and, due to the central geometry, very stable test conditions are obtained. This is because small changes in the position of the test emitter in the center of the ionization chamber do not cause a change of the ionization in the interior and hence of the measured signal.

Figure 5:
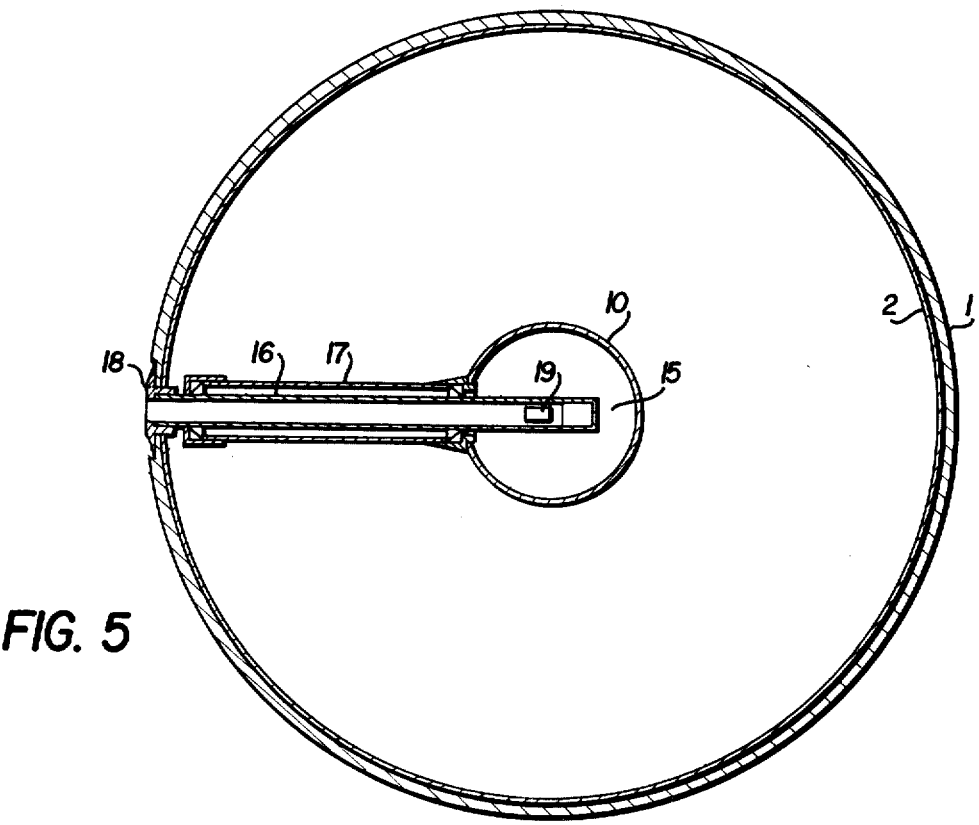
FIG. 5 shows a spherical SSI suitable for radiation protection measurements according to the invention.

As an example, FIG. 5 shows a spherical SSI for radiation protection measurements, which, due to its large interior volume (diameter about 30 cm), has a measurement sensitivity which is adequate for measuring the radiation in the natural environment. In this design, the outer electrode consists of a hollow sphere with an isolating chamber wall 1 having a conductive coating layer 2 of aluminum on the inner side. The inner electrode 10 also consists of a hollow sphere with an isolating chamber wall, but has a conductive coating layer of aluminum on the outer side. A small aluminum tube 16, acting as a guide tube for the test emitter 19, is mounted in the outer electrode by a mounting ring 18 such that the inner electrode protrudes from the upper side of the chamber. Since the guide tube 16 is not intended to act as an extension of the inner electrode 15, it is electrically screened by the screen tube 17, and thus exerts no influence on the electric field lines in the interior of the chamber. The test emitter 19 is introduced into the guide tube through the mounting ring 18 and remains in the interior of the chamber only during the test measurement.

With a correct selection of the thickness of the chamber wall material, equivalent to tissue, water or air, and the thickness of the layer, for example, of aluminum, for compensating absorption losses, the SSI according to the present invention can be operated within a range of from 20 keV to 1.5 MeV of photon radiation with an energy dependence which is negligibly small for secondary standards.

The thickness of the chamber wall 1 is a function of the band width of the energy which is to be absorbed by the ionization chamber. A broad energy range can be achieved with a wall thickness from 2 to 3 mm. The thickness of, for example, the aluminum coating 2 can be varied as a function of the material of the chamber wall, the wall thickness and the specificity of measurement. The coating is applied with a uniform thickness to the inner wall of the chamber by processes known for the formation of coatings. The weight per unit area of the coating may at most be 0.05 mg/cm$^2$.

Due to the optimum equivalence of the chamber material to tissue, the SSI according to the present invention can be used in particular for measuring the energy dose in tissue or in media equivalent to tissue, or in the water phantom.

The long-term stability, accuracy and energy independence achieved by the features according to the present invention permit its use as a secondary standard for the determination of the energy dose, in particular in tissue or media equivalent to tissue, or in water phantoms.

We claim:

1. An ionization chamber useful as a dosimetric secondary calibration standard having a chamber wall with a neck part and being closed on all sides, an air compensation orifice, an outer electrode formed by a conductive coating on the inner surface of the chamber wall, an inner electrode and an electrically conductive ring surrounding the neck part of the chamber wall, wherein:

said chamber wall has an electromagnetic radiation absorption characteristic equivalent to air, tissue or water, said chamber wall consisting of at least 85% by weight of a base material containing essentially polyacetal in a mixture with up to 20% by weight of polytetrafluoroethylene to which additive have been admixed; and said conductive coating on the inner surface of said chamber wall consists of a material containing one or more elements having an atomic number greater than 8.

2. The ionization chamber of claim 1, wherein said conductive coating forming said outer electrode is produced in the form of an aluminum layer having a density per unit area of not more than 0.05 g/cm².

3. The ionization chamber of claim 1, wherein said chamber wall contains at most 10% by weight of aluminum as an additive.

4. The ionization chamber of claim 1, wherein said chamber wall contains, as an additive, aluminum oxide and carbon, the quantity of aluminum oxide being at most 20% of the additive mixture.

5. The ionization chamber of claim 1, wherein said chamber wall contains a maximum of 5% by weight of CaO as an additive.

6. The ionization chamber of claim 1, wherein said coating located on the inside of said chamber wall is extended over a predetermined length into the neck part of said chamber, said neck being cylindrical, the cylindrical neck part and the protective ring having the same axis, and said chamber further includes a shaft which consists of a non-conductive material and is provided with an electrically conductive coating which forms the inner electrode, passes axially through the interior of the neck part and said conductive coating has a groove formed in the middle zone thereof protruding into said neck part on the inside of the chamber wall, and said neck part is insulated from the inner electrode by said groove, and further, the electrically conductive coating located on said shaft is electrically conductively connected to the protective ring and extends at least to the end of that part of the conductive coating located on the inside of the chamber wall which passes into the neck part.

7. The ionization chamber of claim 1, wherein said chamber is designed so that different radioactive test sources can be introduced from the outside into the interior of the inner electrode of the ionization chamber for a period of testing the suitability of the ionization chamber as a Secondary-Standard ionization chamber.

8. The ionization chamber of claim 7, wherein said radioactive test source is an emitter containing $^{241}$Am.

9. The ionization chamber of claim 1, further including a guide tube which is electrically screened by means of a screen tube for introducing different test sources into the inner electrode.

10. The ionization chamber of claim 1, wherein said additives comprise at least one of calcium oxide, aluminum oxide, aluminum and carbon.

11. The ionization chamber of claim 1, wherein said chamber wall has a maximum thickness of 3 mm.

12. An ionization chamber which can be used as a dosimetric secondary calibration standard, having a chamber wall closed on all sides, an air compensation orifice, a coating of a conductive material formed on the inner surface of a chamber wall as the outer electrode, an inner electrode and an electrically conductive protective ring surrounding the neck part of the chamber wall, wherein said chamber wall has a maximum thickness of 3 mm and has an electromagnetic radiation absorption characteristic equivalent to air, tissue or water and consists of at least 85% by weight of polyacetal and additives consisting of one or more of aluminum, aluminum oxide, calcium oxide and carbon, and the inner surface of said chamber wall is coated with an aluminum layer having a weight per unit area not greater than 0.05 g.

* * * * *